(12) United States Patent
Zeidner et al.

(10) Patent No.: US 6,865,617 B2
(45) Date of Patent: Mar. 8, 2005

(54) SYSTEM MAPS SCSI DEVICE WITH VIRTUAL LOGICAL UNIT NUMBER AND MULTICAST ADDRESS FOR EFFICIENT DATA REPLICATION OVER TCP/IP NETWORK

(75) Inventors: Efraim Zeidner, Kiryat Haim (IL); Alexander Winokur, Haifa (IL)

(73) Assignee: Sepaton, Inc., Southborough, MA (US)

( * ) Notice: Subject to any disclaimer, the term of this patent is extended or adjusted under 35 U.S.C. 154(b) by 768 days.

(21) Appl. No.: 09/862,514

(22) Filed: May 23, 2001

(65) Prior Publication Data

US 2002/0029281 A1 Mar. 7, 2002

Related U.S. Application Data

(60) Provisional application No. 60/206,607, filed on May 23, 2000.

(51) Int. Cl.[7] .................................................. G06F 3/00
(52) U.S. Cl. ............................................... 710/3; 710/8
(58) Field of Search ........................ 710/3, 8, 57; 707/9, 707/205; 709/238, 213; 711/112; 370/466

(56) References Cited

U.S. PATENT DOCUMENTS

| 5,644,787 A | 7/1997 | Nakamura et al. |
| 5,832,308 A | 11/1998 | Nakamura et al. |
| 5,953,540 A | 9/1999 | Raymond |
| 6,173,377 B1 | 1/2001 | Yanai et al. |
| 6,212,582 B1 * | 4/2001 | Chong et al. .................. 710/57 |
| 6,389,432 B1 * | 5/2002 | Pothapragada et al. ..... 707/205 |
| 6,400,730 B1 * | 6/2002 | Latif et al. ................... 370/466 |
| 6,421,711 B1 * | 7/2002 | Blumenau et al. .......... 709/213 |
| 6,427,173 B1 * | 7/2002 | Boucher et al. ............. 709/238 |
| 6,470,382 B1 * | 10/2002 | Wang et al. ................ 709/220 |
| 6,532,517 B1 * | 3/2003 | Wagner et al. .............. 711/112 |
| 6,591,310 B1 * | 7/2003 | Johnson ......................... 710/3 |
| 6,654,830 B1 * | 11/2003 | Taylor et al. ................. 710/74 |
| 6,684,209 B1 * | 1/2004 | Ito et al. ......................... 707/9 |

OTHER PUBLICATIONS

International Search Report from PCT/US.
Satran, Julian et al. Jul. 20, 2001. "iSCSI." www.ietf.org/internet–drafts/draft–ietf–ips–iscsi–07.txt.

* cited by examiner

Primary Examiner—Le Hien Luu
(74) Attorney, Agent, or Firm—Wilmer, Cutler, Pickering, Hale and Dorr (57) ABSTRACT

The present invention combines IP multicasting mechanisms with SCSI protocols to achieve a more efficient data replication or data mirroring scheme. The combination of the IP multicast mechanism with the mapping of virtual unit logical number to real logical unit numbers, combined with the use of SCSI response frames, ensures the integrity of multicasted data. By use of the SCSI protocol over the TCP/IP according to the present invention, there is no further need to transfer multiple copies of the same data on the same communication link, and the routing logic may be removed from initiator and targets to IP routers.

46 Claims, 6 Drawing Sheets

SYSTEM MAPS SCSI DEVICE WITH VIRTUAL LOGICAL UNIT NUMBER AND MULTICAST ADDRESS FOR EFFICIENT DATA REPLICATION OVER TCP/IP NETWORK

RELATED APPLICATIONS

This application claims priority from U.S. Provisional Application No. 60/206,607, filed May 23, 2000, incorporated herein by reference.

BACKGROUND OF THE INVENTION

1. Field of Invention

The invention relates to replication of data in a computer system. More particularly, the present invention relates to utilizing the SCSI transport layer over TCP/IP, via an IP multicast mechanism, in order to replicate data transferred to a SCSI device.

2. Description of the Related Art

The Small Computer Systems Interface ("SCSI") is a popular family of protocols for communicating with I/O devices, in particular storage devices. More to the point, SCSI is the basic protocol for I/O operations between computers and storage subsystems. It is, in essence, a point-to-point protocol.

Another popular protocol is the Transport Control Protocol/Interface Program ("TCP/IP"). TCP/IP is the basic set of communication protocols for general data exchange between computers connected on a communication network. This is a common protocol used to communicate via the Internet.

Currently there is a convergence between the two protocols, that is, SCSI and TCP/IP. In particular, computers that communicate with their subsystems via SCSI are now tending to be interconnected via the Internet and utilizing TCP/IP to communicate with each other.

In view of this convergence, a standard has been proposed for implementing SCSI over TCP. The currently proposed standard "-draft-ietf-ips-iSCSI-06.txt" is available at http://www.ietf.org/internet-drafts/draft-ietf-ips-iscsi-06.txt (herein expressly incorporated by reference) (the "Standard"). The Standard aims to be fully compliant with the requirements laid out in the SCSI Architecture Model-2 Document (also herein expressly incorporated by reference). This Standard provides for transmitting SCSI commands between SCSI devices, over TCP/IP connections. Conventionally, SCSI devices that communicate with each other must be connected via the same SCSI bus. The proposed Standard permits SCSI devices which are not connected via the same SCSI bus to communicate with each other via the Internet, utilizing TCP/IP protocol. According to the Standard, SCSI devices that are separated from one another even by great distances may communicate with each other. The Standard seeks to describe an implementation of SCSI that operates on top of TCP as the transport protocol.

There are numerous higher level storage functions that, in the context of a SCSI protocol, are implemented as a set of point-to-point I/O operations. One of the most well known of these higher level storage functions is Data Mirroring. In Data Mirroring on a conventional SCSI system, data replication is implemented by issuing separate SCSI I/O operations to each device that is intended hold an image of the replicated data.

The following briefly defines some SCSI conceptual terms. The end point of a typical SCSI command is a "logical unit" (LUN). Logical units include, for example, hard drives, tape drives, CD and DVD drives, printers and processors. A collection of logical units is referred to as a "target" and is directly addressable on the network. In a client-server model, the target corresponds to the server. An "initiator" creates and sends SCSI commands to the target. In the client-server model, the initiator corresponds to the client.

A typical SCSI command results in a command phase, data phase and a response phase. In the data phase, information travels either from the initiator to the target (for example, a WRITE command), or from the target to the initiator (for example, a READ command). In the response phase, the target returns the final status of the operation, including any errors. A response signals the end of a typical SCSI command.

In a conventional storage subsystem, data mirroring is accomplished by providing additional logic, generally on the I/O operation level. Typically, for each WRITE operation for data which is mirrored, this additional logic issues a corresponding WRITE operation to every device that maintains the mirrored image of the data. Thus, if a conventional system provides for two-way mirroring, two copies of each WRITE command are sent over the SCSI bus; moreover, two copies of the data associated with the WRITE command are sent over the SCSI bus, resulting in multiple transfers of the same data. Consider, for example, that WRITE commands from an initiator such as a personal computer are to be mirrored to three targets such as three data storage devices, e.g., ZIP drives. Every time the initiator generates a WRITE command which is to be mirrored, the WRITE command and associated data must be sent to all three of the targets. Moreover, the I/O subsystem requires additional complicated logic in order to handle the data replication, error handling and data routing within the SCSI network. As can be seen from foregoing, data mirroring typically dramatically increases the use of the SCSI bus. This, in turn, results in a significantly slower throughput to other devices utilizing the SCSI bus and increases the probability of errors.

Figure 1:
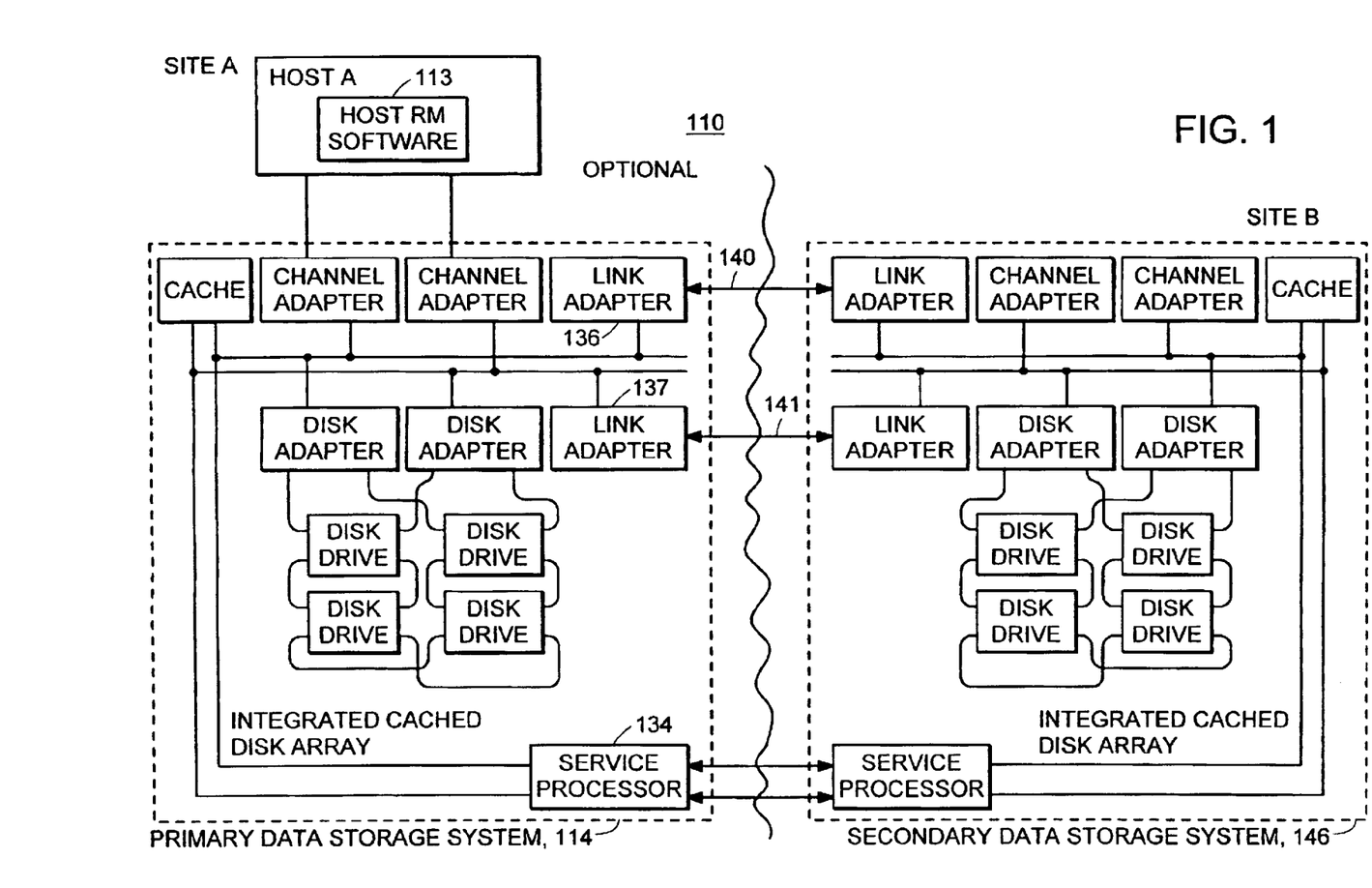
FIG. 1 is a block diagram of a prior art system illustrating remotely mirrored primary and secondary data storage systems and links.

FIG. 1 is an illustration of a typical remote data mirroring system, shown in U.S. Pat. No. 6,173,377 B1, to Yanai et al. This system automatically provides and maintains a copy or mirror of data stored at a location geographically remote from the main or primary data storage device. The data processing system 110 in FIG. 1 can be configured for remote mirroring from a user interface of the service processor 134 in the primary data storage system 114. Remote mirroring software 113 can be provided; host application programs can interface with a remote mirroring facility of the data storage systems 114, 146 via the remote mirroring software 113. According to Yanai process and system, central processing unit 152 could be located with the remote secondary data storage system 146, linked to the primary and secondary data storage systems 114, 146 via redundant signal paths. Communication links 140, 141 from link adapters 136, 137 are provided. To provide remote mirroring operating modes for specific applications, the remote mirroring facility defines an operating mode for each logical volume of data in the storage device as in the data storage systems 114, 146. A specific set of methods are provided in order to remotely mirror data according to either a synchronous or a semi-synchronous mode. When a host writes data to a remotely mirrored volume, a series of steps occurs. Data is written to the cache of the data storage system with the primary volume; an entry is queued up to transmit data to the secondary volume; the secondary volume's data storage system acknowledges receipt of the data; and a write end signal is returned to the host that initiated the WRITE request.

BRIEF SUMMARY OF THE INVENTION

It is the intent of this invention to provide a method, system and/or means for mirroring data transfer commands in a network, the network including a SCSI initiator and SCSI targets, the initiator and targets all being connected to a TCP/IP network. Included is transmitting, from the initiator, a registration command via the TCP/IP network, to each target of the targets, the registration command including a multicast address and a virtual logical unit number. Also included is establishing a mapping, responsive to the registration command, at each of the SCSI devices, indicating an association between the SCSI device and the virtual logical unit number and the multicast address. Further included is transmitting, from the initiator, a SCSI data transfer command, the SCSI data transfer command indicating the multicast group address. Also included is receiving, at each of the members of the multicast group, the data transfer command, and transferring data in response thereto. Further included is executing, in each of the SCSI members of the multicast group, the specified data transfer command.

According to one embodiment of the invention, the invention includes transmitting, from the initiator, to each target of the targets, a mirroring termination command. According to an embodiment, the mirroring termination command causes a disassociation from the virtual logical unit number; optionally, the mirroring termination command causes a disassociation from the multicast group.

According to a preferred embodiment of the invention, the data transfer command is a WRITE command. The WRITE command specifies the virtual logical unit number. A sequence may included multiple WRITE commands.

According to a preferred embodiment of the invention, the registration command is transmitted to a unicast address corresponding to each of the targets. Preferably, the registration command has a standard SCSI text command format.

According to a highly preferred embodiment, each of the targets responds to the registration command by setting a communication NIC to listen on the multicast address; and by mapping the virtual logical unit number to the SCSI device. Further, according to the highly preferred embodiment, upon establishing the mapping, each of the targets returns a message to the initiator.

According to a preferred embodiment, the data transfer command is transmitted via a multicast. Further according to a preferred embodiment, wherein each of the SCSI members of the multicast group returns a status of the data transfer command, and the initiator handles any error status of the data transfer command.

Moreover, according to another embodiment, each of the targets returns, to the initiator, a status indicating completion of the mirroring termination command.

The present invention proposes to take advantage of the IP multicasting mechanism, to simplify the logic to a great extent, to eliminate unnecessary data replication and to take advantage of general multicasting logic already implemented in most IP routers. These and other objects, features and advantages of the present invention are readily apparent from the following drawings and detailed description of the preferred embodiments.

BRIEF DESCRIPTION OF THE SEVERAL VIEWS OF THE DRAWING

The above-mentioned and other advantages and features of the present invention will become more readily apparent from the following detailed description and the accompanying drawings, in which.

DETAILED DESCRIPTION OF THE INVENTION

The following detailed description of the preferred embodiment includes many specific details. The inclusion of such details is for the purpose of illustration only and should not be understood to limit the invention. Throughout this discussion, similar elements are referred to by similar numbers in the various figures for ease of reference.

Figure 2:
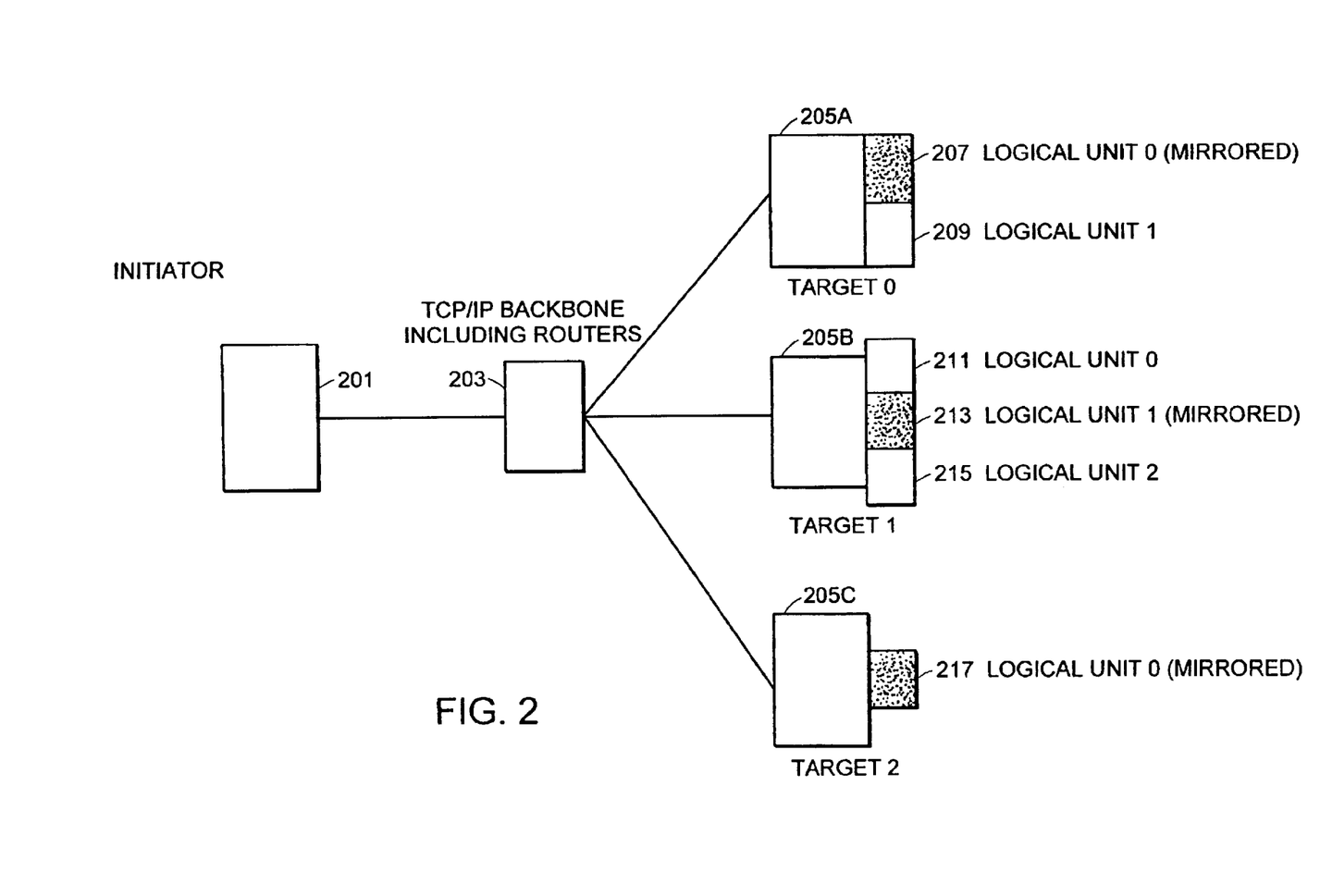
FIG. 2 is a blocked diagram illustrating a SCSI initiator connected via the Internet (a TCP/IP backbone and appropriate routers) to targets.

FIG. 2 is an exemplary embodiment of a SCSI initiator 201 that is connected via a TCP/IP backbone 203 including routers to three targets, target 0 205A, target 1 205B, and target 2 205C. According to highly preferred embodiments, the SCSI initiator 201 and the targets 205A, B and C are connected to the Internet as specified in the Standard.

Although for the purposes of illustration it assumed that the TCP/IP backbone including routers is part of the global Internet, it should be noted that the invention can be applied to any system utilizing SCSI buses which are interconnected via a TCP/IP protocol. Thus, the invention could easily be used on an Intranet, for example.

Typically, a target is connected via a SCSI bus to its own SCSI devices or logical units. In the example shown in FIG. 2, target 0 205A includes two SCSI devices, namely logical unit 0 207 and logical unit 1 209; target 1 205B includes three SCSI devices, logical unit 0 211, logical unit 1 213 and logical unit 2 215; also included is target 2 205C including one SCSI device, namely logical unit 0 217. In this example, it is intended that logical unit 0 207 of target 0 205A, logical unit 1 213 of target 1 205B and logical unit 0 217 of target 2 205C are mirrored.

This example configuration will be used in the following discussion of the method according to the invention. Reference is made to FIG. 2, in connection with describing the mirroring of all WRITE commands generated by the initiator 201 on three SCSI devices logical unit 0 207 on target 0 205A, logical unit 1 213 on target 1 205B and logical unit 0 217 on target 2 205C (the mirrored devices). More specifically, all WRITE commands from the initiator 201 will be executed by the mirrored devices.

The Standard accommodates the expansion of commands to include special commands which are not defined in the Standard. Nevertheless, in order to accommodate the special commands, the initiator and the SCSI devices need to be modified somewhat in order to recognize the special commands. The present invention is advantageously implemented in accordance with the Standard's provisions that accommodate using such special commands.

Accordingly, the SCSI devices utilized at the targets should be modified somewhat from a standard SCSI device. As a first point, the SCSI devices should be capable of connecting to a TCP/IP network, preferably as described in the Standard. Further, in order to use SCSI devices according to the invention, the devices should be modified to be capable of recognizing the special commands relating to data mirroring, and of executing subsequently received commands appropriately.

The present invention does not necessarily contemplate any alterations of the non-WRITE operations, or of any other operation defined in the Standard.

The invention envisions four stages, in order to implement the mirroring of WRITE operations to multiple targets:

Multicast group establishment phase.

Data transfer phase.

Response reception phase.

Mirroring termination phase.

Each of these phases will be discussed in greater detail below. It is possible to have multiple data transfer and response reception phases following the multicast group establishment phase, and prior to the mirroring termination phase.

Multicast Group Establishment Phase

Reference is made again to the example in FIG. 2. The multicast group establishment phase involves the following steps, not necessarily in this order. First, each of the designated targets which is intended to be a part of the multicast group is associated with a multicast address. Next, each of the SCSI devices that are intended to be part of the multicast group are associated with a particular virtual logical unit number. In this manner, a command which is sent to the particular virtual logical unit number may be interpreted to be mirrored to each of the logical unit numbers which constitute a part of the multicast group.

For example, assume that targets 0, 1 and 2 of FIG. 2 are intended to be associated with a multicast group. According to the first step, targets 0, 1 and 2 are associated with the multicast address. Second, the device with logical unit number 0 207 at target 0 205A, the device with logical unit 1 213 at target 1 205B and the device with logical unit number 0 217 at target 2 205C are associated with the same virtual logical unit number.

It will be appreciated that SCSI devices should be modified in order to be capable of recognizing a command to associate themselves with a virtual logical unit number, to execute subsequently received commands specifying that virtual logical unit number, and to recognize a command to disassociate themselves from the virtual logical unit number.

In accordance with the foregoing, part of the multicast establishment phase includes informing the SCSI devices that are intended to participate in the mirroring of a virtual logical unit number associated with the group. Subsequently, WRITE commands that are intended to be mirrored will specify the virtual logical unit number, and need not specify the individual actual logical unit numbers of the mirrored SCSI devices.

A portion of the multicast establishment phase has the purpose of informing all SCSI devices that are intended to participate in the mirroring of a virtual logical unit number associated with a group. All subsequent WRITE commands that are to be mirrored will specify the virtual logical unit number.

Once the multicast group has been established, any message sent by the initiator specifying the multicast address or the virtual logical unit number will be distributed to all targets that are part of that group. Also, all WRITE operations (discussed in detail below) that specify the virtual logical unit number of the multicast group will be executed by all SCSI devices associated with that virtual logical unit number.

The multicast establishment phase is intended to be executed at the beginning of a sequence of commands which are intended to be mirrored. Advantageously, the multicast group establishment phase is executed only once. However, the multicast establishment phase could be re-executed, as might be desirable, for example in order to change the definition of the group. For example, a re-transmission of the multicast establishment phase could result in adding or deleting targets from the group.

Figure 3:
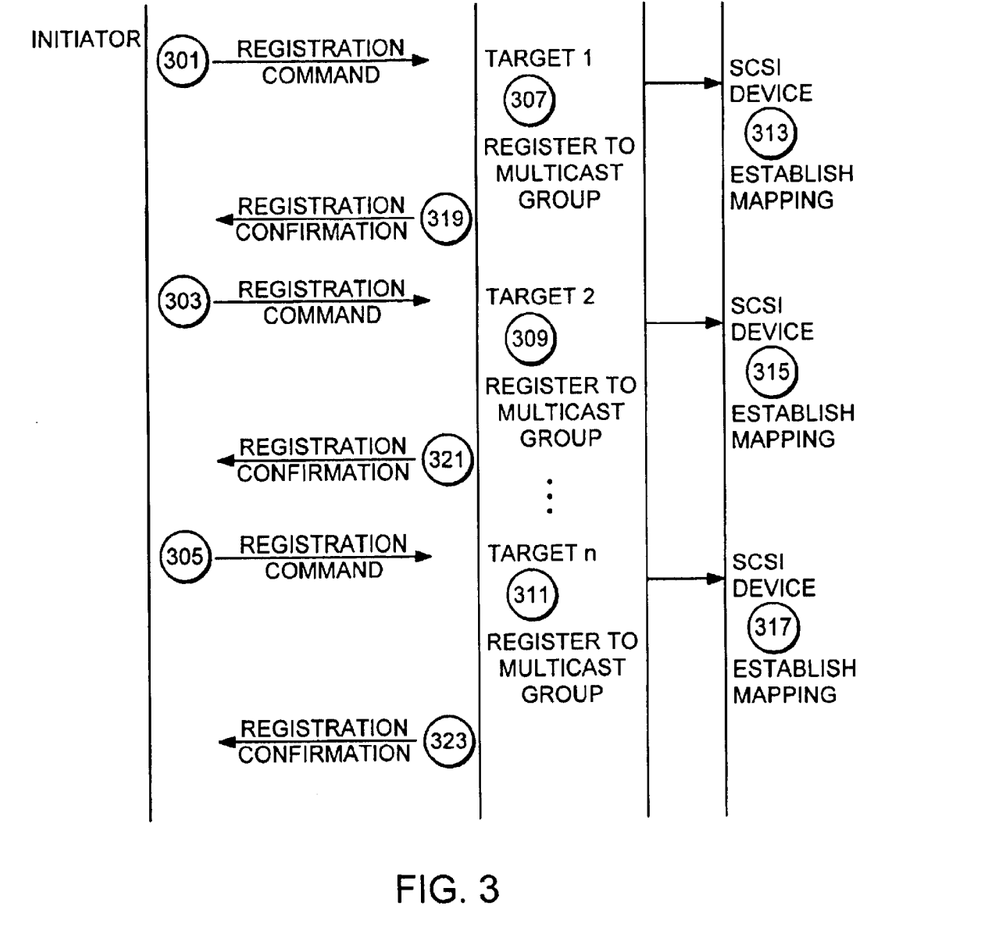
FIG. 3 is a diagram illustrating the registration command protocol.

Reference is made to FIG. 3, showing the preferred protocol for a multicast group establishment phase. Multicast group establishment is accomplished according to the following steps:

1. The initiator transmits a SCSI registration command, via the TCP/IP connection, to each target that will participate in the mirroring. As illustrated, the initiator transmits a registration command 301 to target 1; transmits a registration command 303 to target 2; and continues until it transmits the final registration command 305 to the final target n. Each of these registration commands is sent to the Unicast address of each one of the targets.

According to highly preferred embodiments, the registration command is implemented using the standard SCSI text command as defined in the "Standard" section 2.8, reproduced below.

The standard SCSI text command includes a text field. In the text field, the registration command specifies the following information, as illustrated above: the multicast group IP address, the SCSI logical unit of the SCSI device to which the command is sent, and the SCSI virtual logical number to be used by future WRITE commands that are to be mirrored.

The following illustrates an example of the text field of preferred registration command for a target with three logical units (luns) to participate in a mirror session:

Command=register multicast_group_ip=X.X.X.X\0 lun_map=(lun1#,lun2#,lun2#),vlun#)\0

Note that all three SCSI devices on the same target have to be mapped to the same virtual deviceConsider the example shown in FIG. 2. Assume that the multicast group ip address to be used is 128.12.15.3. The registration command sent to target 1 will specify, as illustrated below, the virtual logical unit number, and the logical unit number one, thereby informing target 1's device with logical unit 1 that it should associate itself with the specified virtual logical unit number. The following text portion in the registration command uses the above-illustrated format for the just-discussed example:

Command=register\0 multicast_group_ip=128.12.15.3\0 lun_map=(1,5)\0 mapping lun 1 to virtual lun 5

As was indicated above, SCSI devices participating in the mirroring according to this invention should be modified to recognize and operate under the registration command.

It is possible for multiple SCSI devices at a single target to become part of the group. In that instance, the registration command would specify more than one logical unit number, so that all specified SCSI devices at that target associate themselves with the virtual logical unit number. Alternatively, multiple registration commands, one for each SCSI device, can be directed to the target with the multiple SCSI devices which are part of the group.

2. Responsive to the registration command, the targets will respond by registering to the multicast group using the group IP address. As shown in FIG. 3, target 1 registers to the multicast group 307, target 2 registers to the multicast group 309, and so on until target n which also registers to the multicast group 311. A target may register to the multicast group by: 1) setting the communication NIC to listen on the specified multicast address; and 2) setting the target's internal (implementations specific) data structures to map the virtual lun number with the real devices.

3. In response to the registration command, SCSI devices within a target will establish a mapping between the SCSI virtual logical unit number, as specified by the registration command, and the device's real SCSI logical unit number. As shown in FIG. 3, in response to the registration command passed through the target, the SCSI device at target 1 establishes the specified mapping 313, the targeted SCSI device of target 2 establishes the specified mapping 315 and so on until the final SCSI device at the final target n, which also establishes the specified virtual logical unit number to logical unit number mapping 317.

4. Upon completion of the actions performed to become responsive as part of the multicast group, each target preferably sends a message back to the initiator that it has completed the registration process. According to highly preferred embodiments, each of the targets will send the response after the target has registered to the multicast group and the specified SCSI devices at the target have established the appropriate mapping. Preferably, the message is returned as a SCSI text response frame back to the initiator as specified in section 2.9 of the Standard, and reproduced below.

As illustrated in FIG. 3, each target sends the registration confirmation message to the Unicast address of the initiator. Thus, target 1 returns a registration confirmation 319 to the initiator, target 2 returns a confirmation 321 to the initiator, and so on until the final target n returns a registration confirmation 323 to the initiator.

The multicast group establishment phase is complete when the initiator has received a confirmation from all targets in the multicast group confirming that all targets and all SCSI devices on those targets that have been specified are registered with the group.

According to one alternative embodiment, the same group of targets may participate in multiple mirroring sessions however on different devices. In this alternative, the same group of targets are included in multiple multicast groups, however, typically a different initiator will be was responsible for each different multicast group. Referring back to the example of FIG. 2, the first mirroring session can include one group of devices including the device at target 0 with logical unit number 0, the device at target 1 with logical unit number 1, and the device at target 2 with logical unit number 0. The second mirroring session may consist different devices. The first group of devices may mirror WRITE commands from one initiator in the first mirroring session, and the second group of devices would mirror WRITE commands from another initiator as the second mirroring session. In this example, the multicast address for the first and second groups can be the same since the same targets are included in both groups. Nevertheless, the virtual logical unit number for the first group should be different from the virtual logical unit number for the second group.

According to another alternative, the same group of targets are participating in multiple mirroring sessions. However, according to this alternative, both groups of devices mirror WRITE commands from the same initiator.

In yet another alternative, multiple initiators can participate in the same mirroring session. In this case however the initiator registering the session needs to inform the other initiators through TCP/IP or any other communication means of the multicast address and the virtual logical unit for the session.

In conventional systems, when targets register to a group or associate themselves with a multicast address, it is the target that must initiate the registration process. Thus, in a traditional system, if an initiator was transmitting some audio visual data such as a movie, and a target wanted to receive the data, it was up to the target to register or associate itself with the multicast address. However, according to the present invention, the initiator is responsible for establishing the group. That is, by sending the registration commands to pre-determined targets, the initiator controls which targets join the group.

Data Transfer Phase

The data transfer phase is executed every time the initiator sends a WRITE command to the multicast address. This assumes that the multicast group has been established. During the data transfer phase, the data which is being written is transferred from the initiator to each of the targets which are part of the multicast group.

Figure 4:
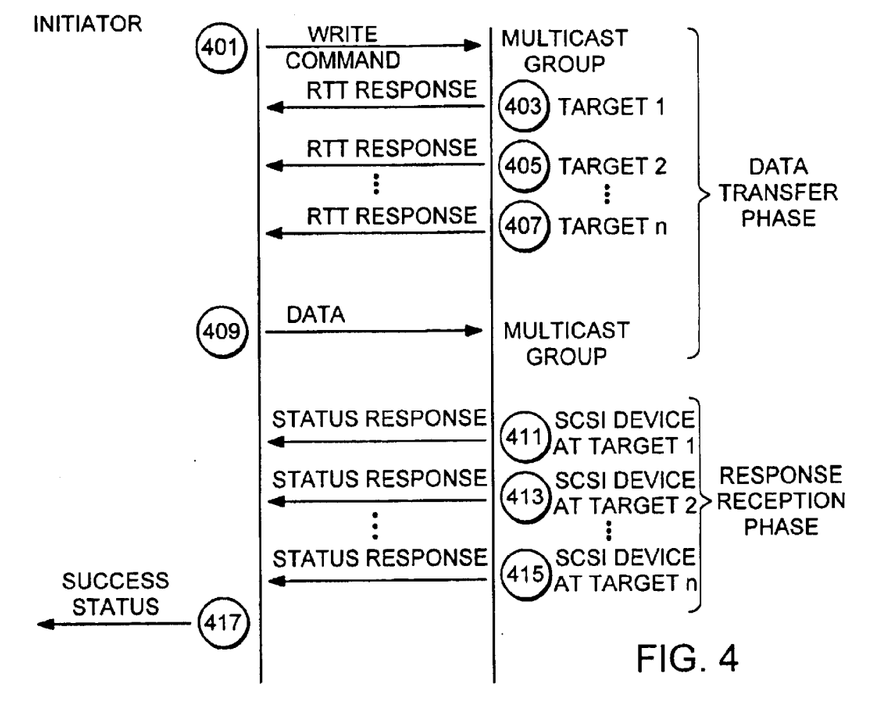
FIG. 4 is a diagram illustrating data transfer phase protocol.

According to the data transfer phase, a WRITE command is transmitted to the multicast group, resulting in a WRITE I/O to each of the logical units that constitute a part of the multicast group. The data transfer phase is preferably done according to the following steps:

1. The initiator sends a SCSI WRITE 401 command to the multicast group IP address, that is the group established by the multicast group establishment phase. The command is multicast to all targets participating in the mirroring. Advantageously, this is done the same way that any standard SCSI command would be multicast, preferably in accordance with the Standard. In the illustrated preferred protocol for the data transfer phase, there is a single WRITE command 401 being sent from the initiator to the entire multicast group.

A typical write command can be found in the Standard in section 2.7, reproduced below.

2. Each target member of the multicast group then returns a ready status indication to the initiator, advantageously via a standard ready to transfer ("RTT"), preferably sent as a SCSI response in accordance with the Standard. The RTT should be sent from every target which was configured as part of the multicast group. Thus, as illustrated in FIG. 4, target 1 returns a RTT response 403, target 2 returns a RTT response 405 and so on through the final target n which also returns a RTT response 407. The initiator waits until it receives a RTT response from every target, prior to sending the actual data transmission itself.

3. Having received a RTT from each of the targets, the initiator then sends the data portion of the command 409 to the multicast group IP address and the corresponding virtual logical unit number. As is illustrated, the data is thereby transferred to multiple SCSI devices using a single data command.

In accordance with highly preferred embodiments, the initiator can obtain the status of the WRITE command from each member of the multicast group during the response phase, discussed below.

Errors in transmitting all of the data maybe handled in any of several ways. Conventionally, there is no standard way of ensuring that each member of a group in a conventional system receives every data block sent by an initiator to a multicast address. Loss of data may be unimportant, such as in the case of transmission of audio/visual data, for example, a movie or video conference. In such situations, it is not fatal if a target occasionally does not receive one of the transmitted blocks. In those situations, missing a block could merely cause the target to lose the signal for some fraction of a second, and moreover receiving a re-transmitted block could have undesirable results. Nevertheless, when truly mirroring data WRITE commands, for example in providing redundant data storage, it is essential that every target receives every data block transmitted by the initiator, in order to maintain the integrity of the transmitted data.

The standard SCSI WRITE command specifies the amount of data that is going to be written. As a result, in the preferred embodiment, a SCSI device is aware of precisely how much data it should receive as part of any WRITE command. If any SCSI device receives less data than what is expected from a WRITE command, it can report to the initiator that all data was not received.

Figure 5:
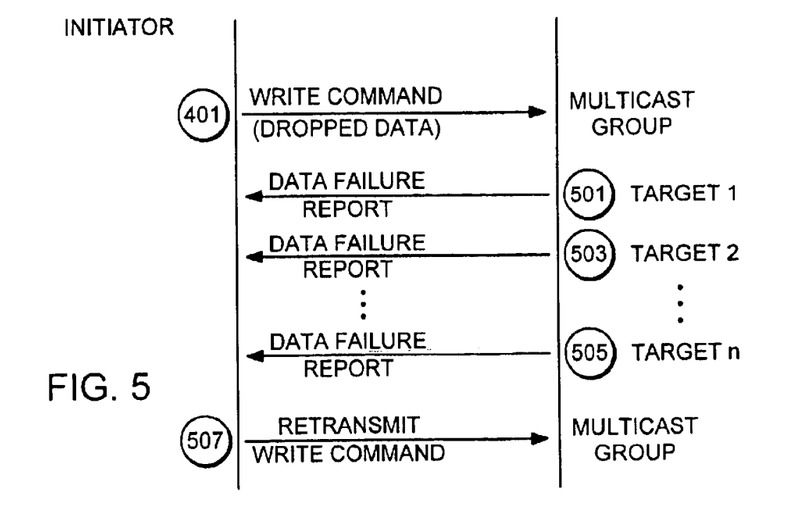
FIG. 5 is a diagram illustrating one version of data transfer error handling protocol.

Reference is made to FIG. 5. Here, it is illustrated that a WRITE command 401 was transmitted from the initiator to the multicast group. In this particular example, each of the targets experience a data failure. Thus, target 1 returns a data failure report 501, target 2 returns a data failure report 503, and so on through the final target n which also returns a data failure report 505. In this situation, it is appropriate for the initiator to re-transmit the entire WRITE command 507 to the entire multicast group.

Figure 6:
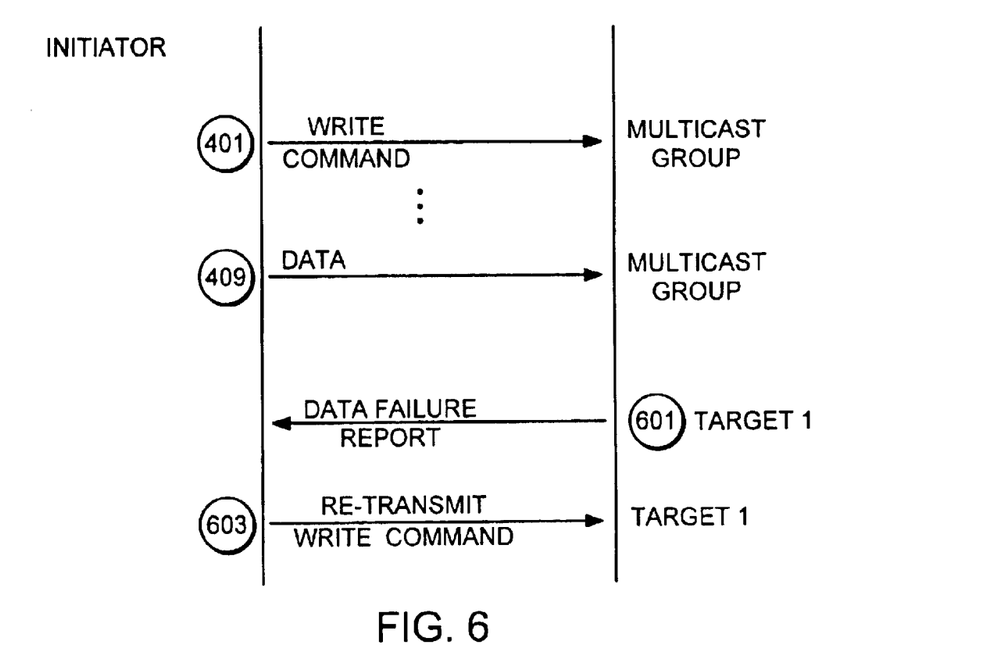
FIG. 6 is a diagram illustrating another version of data transfer error handling protocol.

More typically, in a data transfer error, it is just one of the targets or one of the SCSI devices at one of the targets that has experienced data failure. Reference is made to FIG. 6. Here, the WRITE command 401 was transmitted from the initiator to the multicast group. This WRITE command dropped data to one of the targets. Target 1, which experienced the data failure, then returns a data failure report 601 to the initiator. The initiator then re-transmits the WRITE command 603 as a unicast to the target that indicated it had dropped the data. This can be repeated for additional targets that have experienced dropped data.

Figure 7:
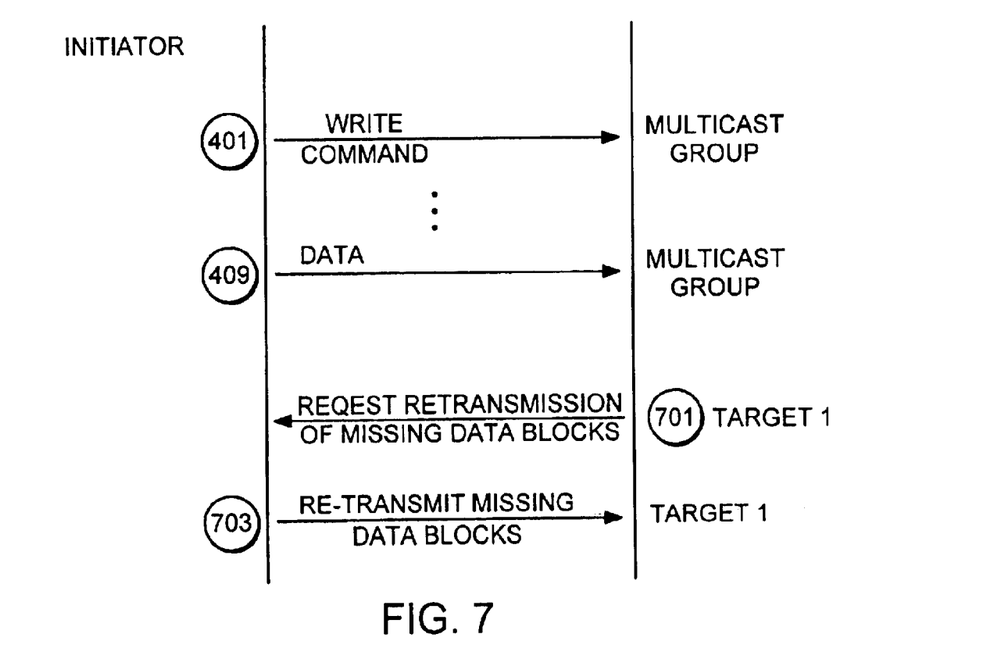
FIG. 7 is a diagram illustrating a third version of data transfer error handling protocol.

Reference is made to FIG. 7. As an alternative to handling errors in the data transfer phase, and avoiding re-transmitting the WRITE command, it may be desirable to re-transmit only those data blocks that were not received. According to this alternative, the initiator labels or numbers each data block of a transmission. SCSI devices receiving the data then note the numbers or labels of the data blocks as they are received. If less than the total amount of data or data blocks were received by the SCSI device during a WRITE command, the SCSI device missing data can determine which block or blocks were not received and request a re-transmission of only those missing data blocks 701. The initiator then re-transmits just the missing data blocks 703 via unicast to the SCSI device that requests the re-transmission. According to this alternative, SCSI devices would be modified to be capable of monitoring data block numbers and labels.

The foregoing are given by way of example for handling of data transmission errors. Nevertheless, other solutions for ensuring that every target in the group receives all of the data blocks transmitted by the initiator will be apparent to those skilled in the art.

Response Reception Phase

It is advantageous to have a response reception phase executed following each transmission by the initiator of a WRITE command to the multicast address. During the response reception phase, each of the targets reports status information associated with the WRITE command back to the initiator. The initiator may then determine if the WRITE command was successful at the multicast group level.

Reference is made back to FIG. 4. Following the data transfer phase, the response reception phase is performed. It is done in the following steps:

1. Conventionally, SCSI devices always report the status of a WRITE command to the initiator. According to the preferred embodiment, each of the SCSI devices indicates the status of the multicast WRITE command in the same way it would report the status of a conventional WRITE command. During the response reception phase, each SCSI device associated with the virtual logical unit number specified by the WRITE command will send their status information to the initiator. Thus, as illustrated, following the data portion of the WRITE command 409, the SCSI device at target 1 transmits a status response 411, the SCSI device at target 2 transmits a status response 413, and so on through the final SCSI device at target n which also transmits a status response 415 to the initiator. Preferably, these are conventional status responses and are sent via unicast to the initiator's TCP/IP address. The responses need not be multicast.

The initiator itself should wait until it receives a status response 411, 413, 415 from all the targets in the multicast group. Provision can be made to time out in the event that a status response does not arrive from a SCSI device at a particular target.

2. If all responses received from all the targets indicate a successful WRITE completion, then the initiator may return a "successful operation" indication to the application 417. On the other hand, if one of the responses indicates a failure or is not received, then the error should be handled. One possible action is to return a status to the application from the initiator, wherein the status indicates a bad WRITE and uniquely identifies the failed target, thereby allowing the application itself to take any recovery action it may choose. Alternatively, the initiator itself may retry the WRITE operation to the failed target using its unicast TCP address.

The response reception phase could be omitted in certain embodiments, particularly in situations where the status of the data transfer is inconsequential. However, in most data mirroring situations, it is anticipated that application program will want to be aware of the successful completion (or lack thereof) of each write operation.

Mirroring Termination Phase

The mirroring termination phase is used to disband the multicast group. More specifically, it disassociates the targets from the multicast address and disassociates the SCSI devices from the virtual logical unit number. It should be necessary to execute this phase only once following the establishment and completion of the multicast group WRITE (or series of WRITEs). After execution of the mirroring termination phase, WRITE commands from the initiator will not be mirrored to members of the multicast group.

Figure 8:
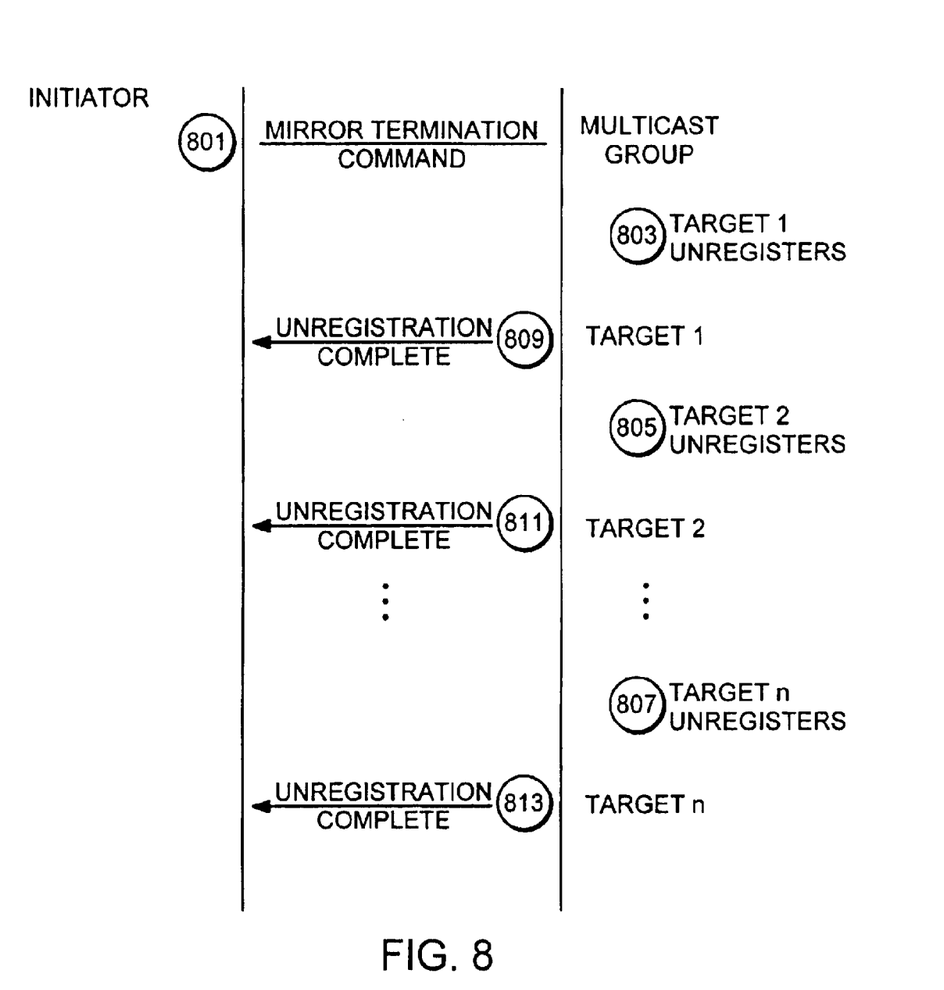
FIG. 8 is a diagram illustrating the protocol for mirroring terminating phase protocol.

Reference is made to FIG. 8. The termination phase is performed according to the following steps:

1. The initiator sends a command indicating that the mirroring phase is terminated 801. Preferably, this is done via a standard text SCSI command, and indicates the mirroring termination phase on the particular multicast group address. This command is also preferably based on the SCSI command. According to the preferred embodiment, the text field of the mirroring termination command will specify both the multicast group address and the virtual logical unit number which are to be terminated.

An example format for the preferred embodiment of the text portion for the mirroring termination command follows:
   command=terminate\0
   virtual_lun=vlun#\0

Each target receiving the mirroring termination command will unregister itself from the multicast group, further removing the association between its logical unit numbers and its virtual logical unit number for this particular session. As is illustrated in FIG. 8, the first target unregisters itself 803, the second target unregisters itself 805, and so on through the final target n which also unregisters itself 807. Unregistration does the following two things: 1) removes the mapping between the devices and the virtual device from the target's internal data structures; and 2) if this is the last mirroring session for the target, instructs the communication NIC to stop listening on the multicast IP address.

3. Upon completion of the unregistration tasks, each of the targets will then send a text response frame, preferably as specified in section 2.9 of the Standard (reproduced below), indicating completion of the mirroring termination phase to the initiator. Thus, upon completion of unregistration, target 1 returns an unregistration complete text response frame 809 to the initiator, target 2 returns a similar unregistration complete text response frame to the initiator 811, and so on through the final target n which also returns an unregistration complete response frame 813 to the initiator.

This invention has been described in connection with specific examples, which are intended to illustrate the invention. The invention, nevertheless, encompasses many variations on the described examples. For example, although the invention has been described in connection with three example targets, it is equally applicable to more or fewer targets. Further, although the illustrated example includes one, two or three SCSI devices on each target, the invention is equally applicable where there are more than three logical units on each target. Also, the illustrated example presumes that the initiator communicates with the targets through a TCP/IP backbone including routers; it is technically possible to implement the invention without utilizing a TCP/IP backbone and/or a router. Further, certain examples assume that the data transfer command that is mirrored is a WRITE command; the multicast may be equally applicable to other data transfer commands which are not technically WRITE commands.

Moreover, although the preferred embodiment of the invention utilizes the SCSI/TCP formats established in the Standard, it is possible to implement the commands so that they are not in conformance with the Standard, so long as the SCSI devices are adapted to recognize such commands. Also, one of skill in the art will recognize that there are other appropriate methods for error recovery in addition to those outlined herein; the invention is intended to encompass such error recovery methods. The protocols have been illustrated with targets 1, 2 ... n, although the invention is equally applicable to any number of targets, including just one target. Specific methods for registering to the multicast group, and for establishing mapping have been provided by way of example; equally appropriate methods will be apparent and are encompassed by the invention. Also, the exchange of transmissions according to the protocols has been illustrated in an orderly fashion; the sequence of transmissions may occur in a different order and still be within the scope of the invention.

Sections 2.7, 2.8 and 2.9 of the current version of the Standard are reproduced below for reference:

2.7 SCSI Data-out & SCSI Data-in

The typical data transfer specifies the length of the data payload, the Target Transfer Tag provided by the receiver for this data transfer, and a buffer offset. The typical SCSI Data PDU for WRITE (from initiator to target) has the following format:

```
Byte/     0     |     1     |     2     |     3     |
  /       |           |           |           |
        |7 6 5 4 3 2 1 0|7 6 5 4 3 2 1 0|7 6 5 4 3 2 1 0|7 6 5 4 3 2 1 0|
        +---------------+---------------+---------------+---------------+
    0  |0|0|0x05    [F] Reserved (0)                                    |
        +---------------+---------------+---------------+---------------+
    4  |Reserved (0) | DataSegmentLength                                 |
        +---------------+---------------+---------------+---------------+
    8  |LUN or Reserved (0)                                              |
        +               +               +               +               +
   12  |                                                                 |
        +---------------+---------------+---------------+---------------+
   16  | Initiator Task Tag                                              |
        +---------------+---------------+---------------+---------------+
   20  | Target Transfer Tag or (0x'ffffffff')                           |
        +---------------+---------------+---------------+---------------+
   24  | Reserved (0)                                                    |
        +---------------+---------------+---------------+---------------+
   28  | ExpStatSN                                                       |
        +---------------+---------------+---------------+---------------+
   32  | Reserved (0)                                                    |
        +---------------+---------------+---------------+---------------+
   36  | DataSN                                                          |
        +---------------+---------------+---------------+---------------+
   40  | Buffer Offset                                                   |
        +---------------+---------------+---------------+---------------+
   44  | Reserved (0)                                                    |
        +---------------+---------------+---------------+---------------+
   48  | Digests if any ...                                              |
        +---------------+---------------+---------------+---------------+
        /DataSegment                                                    /
        +/                                                              /
        +---------------+---------------+---------------+---------------+
```

The typical SCSI Data packet for READ (from target to initiator) has the following format:

```
Byte/     0     |    1     |    2     |    3     |
   /           |          |          |          |
   |7 6 5 4 3 2 1 0|7 6 5 4 3 2 1 0|7 6 5 4 3 2 1 0|7 6 5 4 3 2 1 0|
   +---------------+---------------+---------------+---------------+
 0 |1|1|0x05    [F]   (0) |U|S|  Reserved (0)  |Status or Rsvd |
   +---------------+---------------+---------------+---------------+
 4 |Reserved (0) | DataSegmentLength                              |
   +---------------+---------------+---------------+---------------+
 8 |Reserved (0)                                                  |
   +                                                              +
12 |                                                              |
   +---------------+---------------+---------------+---------------+
16 | Initiator Task Tag                                           |
   +---------------+---------------+---------------+---------------+
20 | Reserved (0)                                                 |
   +---------------+---------------+---------------+---------------+
24 | StatSN or Reserved (0)                                       |
   +---------------+---------------+---------------+---------------+
28 | ExpCmdSN                                                     |
   +---------------+---------------+---------------+---------------+
32 | MaxCmdSn                                                     |
   +---------------+---------------+---------------+---------------+
36 | DataSN                                                       |
   +---------------+---------------+---------------+---------------+
40 | Buffer Offset                                                |
   +---------------+---------------+---------------+---------------+
44 | Residual Count                                               |
   +---------------+---------------+---------------+---------------+
48 | Digests if any ...                                           |
   +---------------+---------------+---------------+---------------+
   /DataSegment                                                   /
   +/                                                             /
   +---------------+---------------+---------------+---------------+
```

2.7.1 F (Final) Bit

For outgoing data, this bit is 1 for the last PDU of unsolicited data or the last PDU of a sequence answering a R2T. For incoming data, this bit is 1 for the last input data PDU associated with the command (even if it includes the status).

2.7.2 Target Transfer Tag

On outgoing data, the Target Transfer Tag is provided to the target if the transfer is honoring a R2T. In this case, the Target Transfer Tag field is a replica of the Target Transfer Tag provided with the R2T.

The Target Transfer Tag values are not specified by this protocol except that the all-bits-one value (0x'ffffffff') is reserved and means that the Target Transfer Tag is not supplied. If the Target Transfer Tag is provided then the LUN field MUST hold a valid value and be consistent with whatever was specified with the command, otherwise the LUN field is reserved.

2.7.3 StatSN

This field MUST be set only if the S bit is set to 1.

2.7.4 DataSN

For input (read) data PDUs, the DataSN is the data PDU number (starting with 0) within the data transfer for the command identified by the Initiator Task Tag. For output (write) data PDUs, the DataSN is the data PDU number (starting with 0) within the current output sequence. The current output sequence is identified by the Initiator Task Tag (for unsolicited data) or is a data sequence generated for one R2T (for data solicited through R2T).

Any input or output data sequence MUST contain less than $2^{**}32-1$ numbered PDUs.

2.7.5 Buffer Offset

The Buffer Offset field contains the offset of this PDU payload data against the complete data transfer. The sum of the buffer offset and length should not exceed the expected transfer length for the command.

Input data ordering is governed by a disconnect-reconnect mode page bit (EMDP). If this bit is 0 the target MUST deliver packets in increasing buffer offset order.

Output data within a burst (initial or any data PDU sequence that fulfils a R2T) MUST be delivered in increasing buffer offset order.

2.7.6 DataSegmentLength

This is the data payload length of a SCSI Data-In or SCSI Data-Out PDU; sending of 0 length data segments should be avoided.

2.7.7 Flags

The last SCSI Data packet sent from a target to an initiator for a particular SCSI command that completed successfully may also optionally contain the Command Status for the data transfer. In this case, Sense Data cannot be sent together with the Command Status. If the command is completed with an error, then the response and sense data MUST be sent in a SCSI Response PDU (i.e., MUST NOT be sent in a SCSI Data packet). For Bi-directional commands the status MUST be sent in a SCSI Response PDU.

b0 S (status)—set to indicate that the Command Status field contains status. If this bit is set to 1 the F bit MUST also be set to 1 b1-2 as in an SCSI Response b3-6 not used (should be set to 0)

The fields StatSN, Command Status, Residual Count have meaningful content only if the S bit is set to 1.

2.8 Text Command

The Text Command is provided to allow the exchange of information and for future extensions. It permits the initiator to inform a target of its capabilities or to request some special operations.

```
Byte/     0     |    1     |    2     |    3     |
   /           |          |          |          |
   |7 6 5 4 3 2 1 0|7 6 5 4 3 2 1 0|7 6 5 4 3 2 1 0|7 6 5 4 3 2 1 0|
   +---------------+---------------+---------------+---------------+
 0 |X|1|0x04    [F]   Reserved (0)                                |
   +---------------+---------------+---------------+---------------+
 4 |Reserved (0) | DataSegmentLength                              |
   +---------------+---------------+---------------+---------------+
 8 |Reserved (0)                                                  |
   +                                                              +
12 |                                                              |
   +---------------+---------------+---------------+---------------+
16 | Initiator Task Tag                                           |
   +---------------+---------------+---------------+---------------+
20 | Reserved (0)                                                 |
   +---------------+---------------+---------------+---------------+
```

-continued

```
  24 | CmdSN                                             |
     +----------------+----------------+----------------+----------------+
  28 | ExpStatSN                                         |
     +----------------+----------------+----------------+----------------+
  32 / Reserved (0)                                      /
    +/                                                   /
     +----------------+----------------+----------------+----------------+
  48 | Digests if any ...                                |
     +----------------+----------------+----------------+----------------+
     /DataSegment Text                                   /
    +/                                                   /
     +----------------+----------------+----------------+----------------+
```

2.8.1 F (Final) Bit

When set to 1 it indicates that his is the last or only text command in a sequence of commands; otherwise it indicates that more commands will follow.

2.8.2 Initiator Task Tag

The initiator assigned identifier for this Text Command.

If the command is sent as part of a sequence of commands (e.g., the Login Phase or a sequence of Text commands) the Initiator Task Tag MUST be the same for all the commands within the sequence (similar to linked SCSI commands).

2.8.3 Text

The initiator sends the target a set of key=value or key=list pairs encoded in UTF-8 Unicode. The key and value are separated by a '=' (0x3D) delimiter. Many key=value pairs can be included in the Text block by separating them with null (0x00) delimiters. A list is a set of values separated by comma (0x2C). Large binary items can be encoded using their hexadecimal representation (e.g., 8190 is 0x1 FFE) or decimal representation. The maximum length of an individual value (not its string representation) is 255 bytes.

The data length of a text command or response SHOULD be less than 4096 bytes. No key SHOULD contain more than 255 characters.

Character strings are represented as plain text. Numeric and binary values are represented using either decimal numbers or the hexadecimal 0x'ffff' notation. The result is adjusted to the specific key.

The target responds by sending its response back to the initiator. The response text format is similar to the request text format.

Some basic key=value pairs are described in Appendix A and D. All of these keys, except for the X- extension format, MUST be supported by iSCSI initiators and targets.

Manufacturers may introduce new keys by prefixing them with X- followed by their (reversed) domain name, for example the company owning the domain acme.com can issue:

X-com.acme.bar.foo.do_something=0000000000000003

Any other key not understood by the target may be ignored without affecting basic function. If the Text Response does not contain a key that was requested, the initiator must assume that the key was not understood by the target or, whenever appropriate, that the response was "none".

Text operations are usually meant for parameter setting/negotiations but can be used also to perform some active operations.

It is recommended that Text operations that will take a long time should be placed in their own Text command.

A session may have only one outstanding text command or text command sequence at any given time.

2.9 Text Response

The Text Response PDU contains the target's responses to the initiator's Text Command. The format of the Text field matches that of the Text Command.

```
  Byte/      0        |       1       |       2       |       3       |
       /             |               |               |               |
       |7 6 5 4 3 2 1 0|7 6 5 4 3 2 1 0|7 6 5 4 3 2 1 0|7 6 5 4 3 2 1 0|
       +----------------+----------------+----------------+----------------+
   0  |X|1|0x04   [F]  Reserved (0)                       |
       +----------------+----------------+----------------+----------------+
   4  |Reserved (0) | DataSegmentLength                   |
       +----------------+----------------+----------------+----------------+
   8  |Reserved (0)                                       |
       +                                                  +
  12  |                                                   |
       +----------------+----------------+----------------+----------------+
  16  | Initiator Task Tag                                |
       +----------------+----------------+----------------+----------------+
  20  | Reserved (0)                                      |
       +----------------+----------------+----------------+----------------+
  24  | StatSN                                            |
       +----------------+----------------+----------------+----------------+
  28  | ExpCmdSN                                          |
       +----------------+----------------+----------------+----------------+
  32  | MaxCmdSn                                          |
       +----------------+----------------+----------------+----------------+
  36  | Reserved (0)                                      |
       +----------------+----------------+----------------+----------------+
  48  | Digests if any ...                                |
       +----------------+----------------+----------------+----------------+
      /DataSegment (Text)                                 /
     +/                                                   /
       +----------------+----------------+----------------+----------------+
```

2.9.1 F (Final) Bit

When set to 1 in response to a text command with the Final bit set to 1 the F bit indicates that the target has finished it's operation. Otherwise if set to 0 in response to a text command with the Final Bit set to 1 it indicates that the target has more work to do (invites a follow-on text command). A text response with the F bit set to 1 in response to a text command with the F bit set to 0 is a protocol error.

2.9.2 Initiator Task Tag

The Initiator Task Tag matches the tag used in the initial Text Command or the Login Initiator Task Tag.

2.9.3 Text Response Data

The Text Response Data Segment contains responses in the same key=value format as the Text Command and with the same length and coding constraints. Appendix C lists some basic Text Commands and their Responses. If the Text Response does not contain a key that was requested, the initiator must assume that the key was not understood by the target or that the answer is <key>=none.

Text response key=value pairs MUST be delivered in the same order as the command key=value pairs whenever applicable.

While this invention has been described in conjunction with the specific embodiments outlined above, many alternatives, modifications and variations will be apparent to those skilled in the art. Accordingly, the preferred embodiments of the invention is set forth above are intended to be illustrative, and not limiting. Various changes may be made without parting from the spirit and the scope of the invention as defined in the following claims.

What is claimed is:

1. A method of mirroring data transfer commands in a network, the network including a SCSI initiator and a plurality of SCSI targets, the initiator and targets all being connected to a TCP/IP network, comprising the steps of:
   (a) transmitting, from the initiator, a registration command via the TCP/IP network, to each target of the plurality of targets, the registration command including a multicast address and a virtual logical unit number;
   (b) establishing a mapping, responsive to the registration command, at each of the SCSI devices, indicating an association between the SCSI device and the virtual logical unit number and the multicast address;
   (c) transmitting, from the initiator, a SCSI data transfer command, the SCSI data transfer command indicating the multicast group address;
   (d) receiving, at each of the members of the multicast group, the data transfer command, and transferring data in response thereto;
   (e) executing, in each of the SCSI members of the multicast group, the specified data transfer command.

2. The method of claim 1, further comprising the step of:
   (f) transmitting, from the initiator, to each target of the plurality of targets, a mirroring termination command.

3. The method of claim 2, wherein the mirroring termination command causes a disassociation from the virtual logical unit number.

4. The method of claim 2, wherein the mirroring termination command causes a disassociation from the multicast group.

5. The method of claim 2, wherein each target of the plurality of targets returns, to the initiator, a status indicating completion of the mirroring termination command.

6. The method of claim 1, wherein the data transfer command is a WRITE command.

7. The method of claim 6, wherein the WRITE command specifies the virtual logical unit number.

8. The method of claim 6, wherein there are a plurality of WRITE commands.

9. The method of claim 1, wherein the registration command is transmitted to a unicast address corresponding to each target of the plurality of targets.

10. The method of claim 1, wherein the registration command has a standard SCSI text command format.

11. The method of claim 1, wherein each target of the plurality of targets responds to the registration command by setting a communication NIC to listen on the multicast address; and by mapping the virtual logical unit number to the SCSI device.

12. The method of claim 1, wherein, upon establishing the mapping, each target of the plurality of targets returns a message to the initiator.

13. The method of claim 1, wherein the data transfer command is transmitted via a multicast.

14. The method of claim 1, wherein each of the SCSI members of the multicast group returns a status of the data transfer command, and wherein the initiator handles any error status of the data transfer command.

15. A method of mirroring data transfer commands in a network, the network including a SCSI initiator and a plurality of SCSI targets, the initiator and targets all being connected to a TCP/IP network, comprising the steps of:
   (a) transmitting, from the initiator, a registration command via the TCP/IP network, to each target of the plurality of targets, the registration command including a multicast address and a virtual logical unit number, wherein the registration command is transmitted to a unicast address corresponding to each target of the plurality of targets, wherein the registration command has a standard SCSI text command format, and wherein each target of the plurality of targets responds to the registration command by setting a communication NIC to listen on the multicast address; and by mapping the virtual logical unit number to the SCSI device;
   (b) establishing a mapping, responsive to the registration command, at each of the SCSI devices, indicating an association between the SCSI device and the virtual logical unit number and the multicast address;
   (c) transmitting, from the initiator, a SCSI data transfer command, the SCSI data transfer command indicating the multicast group address, wherein the data transfer command is a WRITE command, and wherein the WRITE command specifies the virtual logical unit number;
   (d) receiving, at each of the members of the multicast group, the data transfer command, and transferring data in response thereto;
   (e) executing, in each of the SCSI members of the multicast group, the specified data transfer command; and
   (f) transmitting, from the initiator, to each target of the plurality of targets, a mirroring termination command, wherein the mirroring termination command causes a disassociation from the virtual logical unit number.

16. A system for mirroring data transfer commands in a network, the network including a SCSI initiator and a plurality of SCSI targets, the initiator and targets all being connected to a TCP/IP network, comprising:
   (a) a registration command, transmitted from the initiator via the TCP/IP network, to each target of the plurality of targets, the registration command including a multicast address and a virtual logical unit number;
   (b) a mapping, established responsive to the registration command, at each of the SCSI devices, indicating an association between the SCSI device and the virtual logical unit number and the multicast address;
   (c) a SCSI data transfer command, transmitted from the initiator, the SCSI data transfer command indicating the multicast group address; and
   (d) at each of the members of the multicast group, responsive to reception of the data transfer command, a transfer of data.

17. The system of claim 16, further comprising:
   (f) a mirroring termination command, transmitted, from the initiator, to each target of the plurality of targets.

18. The system of claim 17, wherein the mirroring termination command causes a disassociation from the virtual logical unit number.

19. The system of claim 17, wherein the mirroring termination command causes a disassociation from the multicast group.

20. The system of claim 17, wherein each target of the plurality of targets returns, to the initiator, a status indicating completion of the mirroring termination command.

21. The system of claim 16, wherein the data transfer command is a WRITE command.

22. The system of claim 21, wherein the WRITE command specifies the virtual logical unit number.

23. The system of claim 21, wherein there are a plurality of WRITE commands.

24. The system of claim 16, wherein the registration command is transmitted to a unicast address corresponding to each target of the plurality of targets.

25. The system of claim 16, wherein the registration command has a standard SCSI text command format.

26. The system of claim 16, wherein each target of the plurality of targets responds to the registration command by setting a communication NIC to listen on the multicast address; and by mapping the virtual logical unit number to the SCSI device.

27. The system of claim 16, wherein, upon establishing the mapping, each target of the plurality of targets returns a message to the initiator.

28. The system of claim 16, wherein the data transfer command is transmitted via a multicast.

29. The system of claim 16, wherein each of the SCSI members of the multicast group returns a status of the data transfer command, and wherein the initiator handles any error status of the data transfer command.

30. The system of claim 16, wherein each command is embodied as an electronic signal.

31. A system of mirroring data transfer commands in a network, the network including a SCSI initiator and a plurality of SCSI targets, the initiator and targets all being connected to a TCP/IP network, comprising:

(a) a registration command transmitted from the initiator via the TCP/IP network, to each target of the plurality of targets, the registration command including a multicast address and a virtual logical unit number, wherein the registration command is transmitted to a unicast address corresponding to each target of the plurality of targets, wherein the registration command has a standard SCSI text command format, and wherein each target of the plurality of targets responds to the registration command by setting a communication NIC to listen on the multicast address; and by mapping the virtual logical unit number to the SCSI device;

(b) a mapping, established responsive to the registration command, at each of the SCSI devices, indicating an association between the SCSI device and the virtual logical unit number and the multicast address;

(c) a SCSI data transfer command, transmitted from the initiator, the SCSI data transfer command indicating the multicast group address, wherein the data transfer command is a WRITE command, and wherein the WRITE command specifies the virtual logical unit number;

(d) at each of the members of the multicast group, a received data transfer command, and transferring data in response thereto; and (e) a mirroring termination command transmitted from the initiator to each target of the plurality of targets, wherein the mirroring termination command causes a disassociation from the virtual logical unit number.

32. A system ofor mirroring data transfer commands in a network, the network including a SCSI initiator and a plurality of SCSI targets, the initiator and targets all being connected to a TCP/IP network, comprising:

(a) means for transmitting, from the initiator, a registration command via the TCP/IP network, to each target of the plurality of targets, the registration command including a multicast address and a virtual logical unit number;

(b) means for establishing a mapping, responsive to the registration command, at each of the SCSI devices, indicating an association between the SCSI device and the virtual logical unit number and the multicast address;

(c) means for transmitting, from the initiator, a SCSI data transfer command, the SCSI data transfer command indicating the multicast group address;

(d) means for receiving, at each of the members of the multicast group, the data transfer command, and transferring data in response thereto; and (e) means for executing, in each of the SCSI members of the multicast group, the specified data transfer command.

33. The system of claim 32, further comprising:

(f) means for transmitting, from the initiator, to each target of the plurality of targets, a mirroring termination command.

34. The system of claim 33, wherein the mirroring termination command causes a disassociation from the virtual logical unit number.

35. The system of claim 33, wherein the mirroring termination command causes a disassociation from the multicast group.

36. The system of claim 33, wherein each target of the plurality of targets returns, to the initiator, a status indicating completion of the mirroring termination command.

37. The system of claim 32, wherein the data transfer command is a WRITE command.

38. The system of claim 37, wherein the WRITE command specifies the virtual logical unit number.

39. The system of claim 37, wherein there are a plurality of WRITE commands.

40. The system of claim 32, wherein the registration command is transmitted to a unicast address corresponding to each target of the plurality of targets.

41. The system of claim 32, wherein the registration command has a standard SCSI text command format.

42. The system of claim 32, wherein each target of the plurality of targets responds to the registration command by setting a communication NIC to listen on the multicast address; and by mapping the virtual logical unit number to the SCSI device.

43. The system of claim 32, wherein, upon establishing the mapping, each target of the plurality of targets returns a message to the initiator.

44. The system of claim 32, wherein the data transfer command is transmitted via a multicast.

45. The system of claim 32, wherein each of the SCSI members of the multicast group returns a status of the data transfer command, and wherein the initiator handles any error status of the data transfer command.

46. A system for mirroring data transfer commands in a network, the network including a SCSI initiator and a plurality of SCSI targets, the initiator and targets all being connected to a TCP/IP network, comprising:

(a) means for transmitting, from the initiator, a registration command via the TCP/IP network, to each target of the plurality of targets, the registration command including a multicast address and a virtual logical unit number, wherein the registration command is transmitted to a unicast address corresponding to each target of the plurality of targets, wherein the registration command has a standard SCSI text command format, and wherein each target of the plurality of targets responds to the registration command by setting a communication NIC to listen on the multicast address; and by mapping the virtual logical unit number to the SCSI device;

(b) means for establishing a mapping, responsive to the registration command, at each of the SCSI devices, indicating an association between the SCSI device and the virtual logical unit number and the multicast address;

(c) means for transmitting, from the initiator, a SCSI data transfer command, the SCSI data transfer command indicating the multicast group address, wherein the data transfer command is a WRITE command, and wherein the WRITE command specifies the virtual logical unit number;

(d) means for receiving, at each of the members of the multicast group, the data transfer command, and transferring data in response thereto;

(e) means for executing, in each of the SCSI members of the multicast group, the specified data transfer command; and (f) means for transmitting, from the initiator, to each target of the plurality of targets, a mirroring termination command, wherein the mirroring termination command causes a disassociation from the virtual logical unit number.

* * * * *